US008475919B2

(12) United States Patent
Winterhalter

(10) Patent No.: US 8,475,919 B2
(45) Date of Patent: Jul. 2, 2013

(54) WOOL AND ARAMID FIBER BLENDS FOR MULTIFUNCTIONAL PROTECTIVE CLOTHING

(75) Inventor: Carole A. Winterhalter, Marlborough, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 740 days.

(21) Appl. No.: 12/008,304

(22) Filed: Jan. 11, 2008

(65) Prior Publication Data
US 2010/0285285 A1 Nov. 11, 2010

Related U.S. Application Data

(60) Provisional application No. 60/965,694, filed on Aug. 6, 2007.

(51) Int. Cl.
*B32B 19/00* (2006.01)
*D02G 3/00* (2006.01)
*D02G 3/02* (2006.01)
*D03D 15/00* (2006.01)
*C11D 3/00* (2006.01)

(52) U.S. Cl.
USPC ........... 428/357; 428/125; 428/364; 428/377; 428/920; 442/181; 442/184; 442/209; 442/247; 57/210; 57/255; 8/115.51

(58) Field of Classification Search
USPC 428/34.5, 195.1, 362, 377, 370, 920; 442/49, 442/76, 136, 139, 147, 152, 181, 184, 191, 442/197, 334; 57/224, 229, 252, 255, 327, 57/901; 8/115.51
See application file for complete search history.

(56) References Cited

U.S. PATENT DOCUMENTS

| | | | | |
|---|---|---|---|---|
| 4,120,914 A | * | 10/1978 | Behnke et al. | 525/432 |
| 4,758,465 A | * | 7/1988 | McKinney et al. | 442/139 |
| 5,033,262 A | * | 7/1991 | Montgomery et al. | 57/5 |
| 5,238,682 A | * | 8/1993 | Akasaka et al. | 424/409 |
| 5,459,902 A | * | 10/1995 | Hino et al. | 19/236 |
| 5,527,597 A | * | 6/1996 | Stanhope et al. | 442/184 |
| 5,814,824 A | | 9/1998 | Hamby et al. | |
| 5,928,971 A | | 7/1999 | Ellis et al. | |
| 7,065,950 B2 | | 6/2006 | Zhu et al. | |
| 7,100,352 B2 | | 9/2006 | Robins | |
| 2004/0048541 A1 | * | 3/2004 | Offord et al. | 442/364 |
| 2004/0209051 A1 | * | 10/2004 | Santos et al. | 428/195.1 |
| 2004/0261192 A1 | * | 12/2004 | Cardamone et al. | 8/115.51 |
| 2005/0079783 A1 | * | 4/2005 | Campbell et al. | 442/181 |
| 2006/0075574 A1 | * | 4/2006 | Cardamone et al. | 8/115.51 |

FOREIGN PATENT DOCUMENTS

CA 2517070 * 2/2004

OTHER PUBLICATIONS

Press Release. Wool/Nomex Blend Fabric Set to Be Produced. American Sheep Industry. http://www.sheepusa.org/Sheep_Industry_News_Detail/newsID/28/print_only/1. published Jun. 2, 2005.*
Technical Guide for Nomex Brand Fiber. Dupont. H-52720. Revised Jul. 2001. http://www.nakedwhiz.com/gasketsafety/nomextechnicalguide.pdf.*
Winterhalter, Carole. Development of Cloth, Camouflage, Universal Pattern, Flame Resistant, Wool/Nomex Blend. Technical Report. Final Report Jun. 2004-Mar. 2006.*

* cited by examiner

*Primary Examiner* — Elizabeth Cole
*Assistant Examiner* — Altrev Sykes
(74) *Attorney, Agent, or Firm* — Roger C. Phillips

(57) ABSTRACT

A fiber blend for yarns and fabrics for use in military, firefighting, industrial work wear, and first responder protective clothing to provide multifunctional protection to the wearer, the fiber blend including an aramid fiber blend, wool fibers, and electrostatic dissipative fibers, wherein the aramid fiber blend includes meta-aramid fibers, para-aramid fibers and electrostatic dissipative fibers.

13 Claims, No Drawings

WOOL AND ARAMID FIBER BLENDS FOR MULTIFUNCTIONAL PROTECTIVE CLOTHING

CROSS REFERENCE TO RELATED APPLICATIONS

This application claims the benefit of provisional U.S. Patent Application Ser. No. 60/965,694, filed Aug. 6, 2007, the entire contents of which are incorporated herein by reference.

STATEMENT OF GOVERNMENT INTEREST

The invention described herein may be manufactured and used by the U.S. Government for Governmental purposes without the payment of any royalty thereon.

BACKGROUND OF THE INVENTION

1. Field of the Invention

This invention relates to fiber blends for wearing apparel and is directed more particularly to a fiber blend for use in protective clothing to provide multifunctional protection to a wearer.

2. Description of the Prior Art

Combat uniform fabrics have been woven from yarns made from a staple blend of cotton and nylon fibers. This fiber blend supports dyeing and printing using a combination of acid and vat dyes to impart a camouflage pattern providing both visual and near infrared camouflage protection. This cotton and nylon fiber blend yarn, in combination with a lightweight, thin fabric construction, has consistently provided protection, comfort, durability, and UV resistance for US military service personnel for more than twenty years. Many efforts have been undertaken to integrate flame and thermal protection into this fabric, with little success. Novel fibers, fiber blends and functional finishes previously investigated include BASOFIL® melamine, Flame Retardant-Treated (FRT) cotton, FRT cotton/nylon, FRT TENCEL® rayon, FRT cotton/KEVLAR® para-aramid/nylon, carbonized rayon/NOMEX Meta-Aramid®, KEVLAR® para-aramid/Flame Resistant (FR) rayon, NOMEX® meta-aramid/FR rayon, polybenzimidazole (PBI) and PBI/FRT cotton.

Many of the inherently flame resistant fibers have been found unacceptable for use in a homogeneous fabric because of high cost and the requirement for visual and near infrared camouflage. The high polymer orientation of aramids and PBI, for example, contributes to flame resistance, but reduces or eliminates their ability to be dyed with traditional dyestuffs because of the lack of chemical dye sites. Some of these materials achieve coloration by pigment injection in solution form, but their versatility is limited. Aramid blends can be dyed and camouflage printed using proprietary technology, but that adds significantly to the final cost of the finished fabric. Still prized for their inherent flame resistance, some of these fibers have been blended with low cost fibers to reduce the overall cost of the fabric. Flame retardant rayon, which is inherently flame resistant, rather than flame retardant treated, has been blended with aramids in 60/40 and 35/65 percent blend ratios, but these materials have fallen short of the desired fabric strength, and camouflage print thereon has demonstrated poor colorfastness.

Flame-retardant treated cotton has long been the industry standard for use in low cost flame resistant industrial work wear. However, some treatments add 20 percent to the weight of the fabric. Flame-retardant treated cotton has been blended with nylon in 88/12 percent blend ratios, wherein the nylon was added to improve strength. While the addition of the small amount of nylon does not negatively impact flame resistance, a heavier weight fabric of 11 ounces/yard$^2$ is required to achieve relatively acceptable breaking and tearing strengths.

Flame-retardant treated cotton has also been blended with KEVLAR® para-aramid and nylon to enhance flame resistance, prevent break through and improve abrasion resistance in a 58 percent cotton, 27 percent KEVLAR® para-aramid, 15 percent nylon blend ratio. While the KEVLAR® para-aramid is the strongest of the three fibers, it must occupy less than 50 percent of the total material composition to keep costs at an acceptable level, and not interfere with the application of camouflage print dyes which are compatible only with the cotton fiber. The strength of the fabric is dictated by the dominant fiber, which in this case is the lower strength cotton. In addition, the high end and pick count required to anchor the KEVLAR® para-aramid fiber detrimentally reduces the fabric tearing strength to three pounds in the warp and filling directions. PBI has been blended with flame-retardant treated cotton in 20/80 percent blend ratio in 5.0 and 6.6 ounce/yard$^2$ weights; however, the unsatisfactory performance characteristics of the predominant fiber, cotton, prevail.

BASOFIL® melamine fiber has demonstrated low fiber tenacity and developmental efforts have been directed toward insulation, knitted headwear, hand wear, and underwear applications, where high strength is not a critical factor. Blends of carbonized rayon and NOMEX® meta-aramid have been investigated and while they have demonstrated good strength performance they can not be dyed and camouflage printed. Flame-retardant treated TENCEL® rayon demonstrates good strength, but the camouflage thereof has demonstrated poor colorfastness.

Core spun yarns have been investigated and developed with the intent of manufacturing a yarn with a high strength inherently flame resistant core, and low cost readily camouflage printable sheath fiber. The best performing material combination was found to be a cotton sheath, KEVLAR® para-aramid core yarn. However, these materials have also fallen short on strength because only the KEVLAR® para-aramid-based core and not the sheath contributed to the fabric strength.

Low cost, flame resistant wool has been blended with meta-aramid, para-aramid and electrostatic dissipative fiber and various methods have been investigated to identify the most cost effective dyeing and finishing methods to produce the best performing fabric. Various fabrics have been developed and evaluated, including those with producer colored and dyeable meta-aramid fiber, with and without an enzyme treatment to remove wool scales, piece dyed and overprinted, and a group that was printed only. The best performing lowest cost fabric was made from undyed meta-aramid and wool that had not been enzyme treated.

Print options have been investigated. In one, the fabric was first dyed to one of the lighter colors and then overprinted with the darker color screens. In another, the fabric was not dyed and all of the three required colors were printed on the undyed fabric. Dyeing prior to printing has not increased either color yield or the colorfastness properties of the printed fabrics and the fabric has lost strength. Printing directly on the undyed fabric results in better fabric mechanical properties and reduces costs by eliminating an additional manufacturing process. The aramid and wool blend fabric has demonstrated acceptable visual shade and camouflage protection. A fabric that had not been enzyme treated met the performance goals for near infrared camouflage for the colors in the Universal Camouflage Pattern.

Thus, while many of the developmental materials investigated have met fabric flame resistance goals (ASTM D 6413; 2.0 seconds, maximum after flame; 25.0 seconds, maximum after glow; 4.0 inches maximum char length), strength and other performance requirements, such as colorfastness of the camouflage, have fallen short.

An object of the invention is, therefore, to provide a preferred embodiment comprising a fiber blend, a yarn, and a fabric which afford multifunctional protection to a wearer, including flame and thermal protection, UV resistance, electrostatic dissipation, and which accept camouflage coloration and exhibit color fastness to provide visual and near infrared camouflage protection. Another embodiment provides no electrostatic dissipation protection.

Further objects of the invention include the provision of such a fiber blend, yarn and fabric of high strength and durability, but of light weight and comfortable to wear, all at low cost.

Still further objects of the invention include the provision of such a fiber blend, yarn and fabric amenable to treatment with water repellent, oil repellent and insect repellent.

SUMMARY OF THE INVENTION

With the above and other objects in view, a feature of the present invention is the provision of a fiber blend for yarns and fabrics for use in protective clothing to provide multifunctional protection to a wearer, the fiber blend including, by weight about 44% meta-aramid fiber; at least 5% para-aramid fiber; about 50% wool fiber; and at least 1% electrostatic dissipative fiber.

The above and other features of the invention, including various novel details of construction and combinations of parts, will now be more particularly described. It will be understood that the particular device embodying the invention is described by way of illustration only and not as a limitation of the invention. The principles and features of this invention may be employed in various and numerous embodiments, including an embodiment having no electrostatic dissipation, without departing from the scope of the invention.

DESCRIPTION OF THE PREFERRED EMBODIMENTS

There is accordingly provided a fiber blend, yarn, and fabric for use in protective clothing which provide the aforesaid multifunctional protections and benefits. The fabric provides flame and thermal protection, visual and near infrared camouflage protection, comfort, durability, UV resistance, and electrostatic dissipation, all in a single finished fabric of high strength, light weight, and low cost.

The building blocks of fabrics are fibers and yarns. The novel fiber blend is spun into a yarn structure and the yarn is woven, or knitted to form fabric, or assembled into fabric directly from fiber through a non-woven fabrication process. The resulting fabric is subsequently dyed and/or camouflage printed. The fabric can be manufactured for use in any type of garment such as, but not limited to, shirts, pants, shorts, jackets, coveralls, undershirts, under shorts, socks, and the like. The fabric may also be water and/or oil repellent treated, and/or insect repellent treated, and/or enzyme treated.

The fiber blend is about 44% meta-aramid fiber, at least 5% para-aramid fiber, about 50% wool, and at least 1% electrostatic dissipative fiber. An aramid blend, comprising the meta-aramid, para-aramid, and electrostatic dissipative fibers, is a commercially available specialty blend of the three fiber types. The aramid blend comprises about 92% meta-aramid (Nomex), about 5% para-aramid (Kevlar) and about 3% electrostatic dissipative fiber. The percentages of the meta-aramid, para-aramid, wool, and electrostatic dissipative fiber may be varied to meet electrostatic dissipation test requirements. However, too much aramid will increase the cost of the fabric, and detrimentally affect the camouflage performance. A minimum of 5% para-aramid is required to provide break through resistance. The wool fiber diameter is about 20.5 microns, which is known not to irritate the skin. The fabric is dyed and printed using 1:2 metal complex dyes. This aramid and wool fiber blend results in fabrics that are less expensive than a fabric composed entirely of an aramid fiber or aramid fiber blend and does not require the use of subsequent flame-retardant treatments.

The electrostatic dissipation protection of the fabric has been measured and passed after 5 launderings, demonstrating that the electrostatic dissipation protection is durable for the life of the fabric.

The fabric has been sewn into a combat uniform and tested as a system with a t-shirt and briefs using ASTM F-1930, i.e., Standard Test Method for Evaluation of Flame Resistant Clothing for Protection Against Flash Fire Simulations, using an instrumented manikin. After a three second exposure, the clothing system demonstrated a 12% total body burn which is within the acceptable 20% limit. The preferred fabric configuration is woven and camouflage printed, weighs about 6 ounces per square yard, has an air permeability of 31 cubic feet/minute/foot squared, has a warp count of 61 ends per inch and a filling count of 48 picks per inch, is made with two-ply warp yarns, has a breaking strength of 150 pounds in the warp direction and 110 pounds in the filling direction, and a tearing strength of 11 pounds in the warp direction and 8 pounds in the filling direction.

The preferred woven fabric is thus a blend of wool with an undyed aramid blend containing electrostatic dissipative fiber. The use of 1:2 metal complex dyes, which are chemically compatible with wool, and two-ply warp yarns, result in a single lightweight fabric that demonstrates good strength performance and meets the standard visual and near infrared camouflage performance requirements. This combination results in a less expensive flame resistant fabric because 1) it achieves flame protection without the use of an additional flame-retardant treatment for the wool, and 2) it incorporates commercial metal complex dyes, rather than an expensive proprietary dyeing and printing process used on the standard aramid camouflage printed military fabric currently in use.

Alternative embodiments include the addition of water and/or oil repellent treatment, and insect resistant treatment; and an embodiment having no electrostatic dissipation for a wearer having no need of such protection. Such embodiment having no electrostatic dissipation has a fiber blend comprising about 45% meta-aramid fiber, at least 5% para-aramid fiber and about 50% wool. An aramid blend, comprising the meta-aramid and para-aramid fibers, is a commercially available specialty blend of the two fiber types. The aramid blend comprises about 95% meta-aramid (NOMEX®), and about 5% para-aramid (KEVLAR®).

The inventive yarn and fabric find utility in U.S. military applications, including all combat uniform applications for all services, and in further application, including foreign military, firefighting, industrial work wear, and first responder apparel.

The invention provides a fabric that is a low cost alternative over other inherently flame resistant aramid fiber blend fabrics and other flame resistant fiber blend fabrics. Further, the addition of wool, which has a fine fiber diameter, and is hydrophilic, increases the moisture regain of the fabric, improving its user acceptability.

It is to be understood that the present invention is by no means limited to the particular structure herein disclosed, but also comprises any modification or equivalent within the scope of the claims.

What is claimed is:

1. A fiber blend spun into a yarn structure for use in assembling protective clothing to provide multifunctional protection including flame resistance to a wearer, the yarn structure consisting of, by weight:
   about 44% meta-aramid fiber;
   about 5% para-aramid fiber;
   about 50% wool fiber; and
   about 1% electrostatic dissipative fiber;
   wherein each of the fibers and the yarn structure is absent any flame retardant treatment, wherein the yarn structure has a flame resistance that meets requirements for U.S. military applications, foreign military, firefighting, industrial work wear, and first responder apparel and wherein the yarn structure is formed into a fabric that after a three second exposure to a flame, the fabric demonstrates about a 12% total body burn in accordance with ASTM F-1930.

2. The fabric in accordance with claim 1, wherein said wool fibers exhibit a diameter of about 20.5 microns.

3. A fabric in accordance with claim 1 wherein the yarn is assembled into the fabric by a selected one of weaving and knitting.

4. The fabric in accordance with claim 3, wherein the fabric is dyed to a selected coloration.

5. The fabric in accordance with claim 4, wherein said selected coloration is camouflage.

6. The fabric in accordance with claim 3, wherein the fabric is camouflage printed directly onto the fabric.

7. The fabric in accordance with claim 3, wherein the fabric is dyed and/or camouflage printed using 1:2 metal complex dyes.

8. The fabric in accordance with claim 3, wherein the fabric is woven, and said meta-aramid fiber and said para-aramid fiber are not dyed.

9. The fabric in accordance with claim 1, wherein the yarn is a two-ply warp yarn.

10. The fabric in accordance with claim 3, wherein the fabric is treated to repel at least one of water and oil.

11. The fabric in accordance with claim 3, wherein the fabric is treated to be insect repellent.

12. The fabric in accordance with claim 3, wherein the fabric is enzyme treated.

13. The fabric in accordance with claim 3, wherein the fabric weighs about six ounces per square yard.

* * * * *